(12) United States Patent
Okamoto et al.

(10) Patent No.: US 11,702,013 B2
(45) Date of Patent: Jul. 18, 2023

(54) HINGE ARRANGEMENT FOR A VEHICLE SEAT

(71) Applicant: LEAR CORPORATION, Southfield, MI (US)

(72) Inventors: Yoshikazu Okamoto, Monroe, MI (US); Michael J. Walkowski, Clarkston, MI (US)

(73) Assignee: LEAR CORPORATION, Southfield, MI (US)

( * ) Notice: Subject to any disclaimer, the term of this patent is extended or adjusted under 35 U.S.C. 154(b) by 157 days.

(21) Appl. No.: 17/316,891

(22) Filed: May 11, 2021

(65) Prior Publication Data

US 2022/0009420 A1 Jan. 13, 2022

Related U.S. Application Data

(60) Provisional application No. 63/049,667, filed on Jul. 9, 2020.

(51) Int. Cl.
*B60R 7/04* (2006.01)
*B60N 2/42* (2006.01)
*B60N 2/30* (2006.01)

(52) U.S. Cl.
CPC ............ *B60R 7/043* (2013.01); *B60N 2/3045* (2013.01); *B60N 2/43* (2013.01)

(58) Field of Classification Search
CPC .. B60R 7/043; B60N 2/3045; B60N 2/42709; B60N 2/42754
See application file for complete search history.

(56) References Cited

U.S. PATENT DOCUMENTS

| | | | | | |
|---|---|---|---|---|---|
| 5,816,650 | A | * | 10/1998 | Lucas, Jr. | ............ B60N 2/3045 297/188.1 |
| 6,102,463 | A | * | 8/2000 | Swanson | ................. B60R 7/043 297/188.1 |
| 10,086,766 | B2 | * | 10/2018 | Osterhoff | ................. B60N 2/68 |
| 11,465,567 | B2 | * | 10/2022 | Sundaram | ............... B60R 7/043 |
| 2016/0200258 | A1 | * | 7/2016 | Chawlk | ................... B60R 7/043 296/37.14 |
| 2020/0139859 | A1 | * | 5/2020 | Mori | .................... B60N 2/3065 |

FOREIGN PATENT DOCUMENTS

CN 210821911 U 6/2020

* cited by examiner

*Primary Examiner* — David R Dunn
*Assistant Examiner* — Tania Abraham
(74) *Attorney, Agent, or Firm* — Brooks Kushman P.C.

(57) ABSTRACT

A hinge arrangement may be used for a vehicle seat bottom to facilitate pivoting of the seat bottom to open a storage area below the seat bottom. The hinge arrangement may include at least one hinge having two plates connected by a pivot pin and a support structure separate from the at least one hinge. The support structure may be positioned adjacent to the at least one hinge to stop the hinge pin or pins from being ejected in the presence of an impact force.

15 Claims, 5 Drawing Sheets

HINGE ARRANGEMENT FOR A VEHICLE SEAT

CROSS-REFERENCE TO RELATED APPLICATIONS

This application claims the benefit of U.S. provisional application Ser. No. 63/049,667 filed Jul. 9, 2020, the disclosure of which is hereby incorporated in its entirety by reference herein.

TECHNICAL FIELD

The present disclosure relates to a hinge arrangement for a vehicle seat.

BACKGROUND

Vehicle seats such as those found in automobiles and other passenger and commercial vehicles are subject to a variety of forces that result in stresses of various directions and magnitudes at different locations in the seat assembly. Of particular interest may be the forces encountered during a vehicle impact, for example, a front impact with another vehicle or some other object. In these situations, the forces encountered and the resultant stresses may be very high so it is important to have seat components that can react appropriately to these situations. One kind of seat that has special requirements is a seat having a storage compartment below the bottom seat cushion. The seat bottom may be attached to a support structure such as a frame, for example, with hinges to allow the seat bottom to pivot away from the frame to facilitate access to the storage area. In the event of a vehicle impact, especially when the seat is occupied, the seat bottom—and therefore the hinges—may be subjected to high stresses. Therefore, it would be desirable to have a hinge arrangement for a vehicle seat that was designed to manage these high stresses.

SUMMARY

Embodiments described herein may include a hinge arrangement for a vehicle seat that includes a hinge having a first plate pivotably connected to a second plate by an elongated member disposed at least partially through an opening in the first plate and at least partially through an opening in the second plate. The hinge arrangement may further include a support structure disposed proximate to the hinge such that removal of the pin from the openings in the first and second plates is inhibited. The support structure may also be positioned such that deformation of at least one of the first plate or the second plate in a predetermined direction is limited by contact with the support structure. Embodiments may also include a hinge plate configured for controlled plastic deformation in a predetermined area to absorb forces and reduce stresses in other areas of the hinge arrangement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
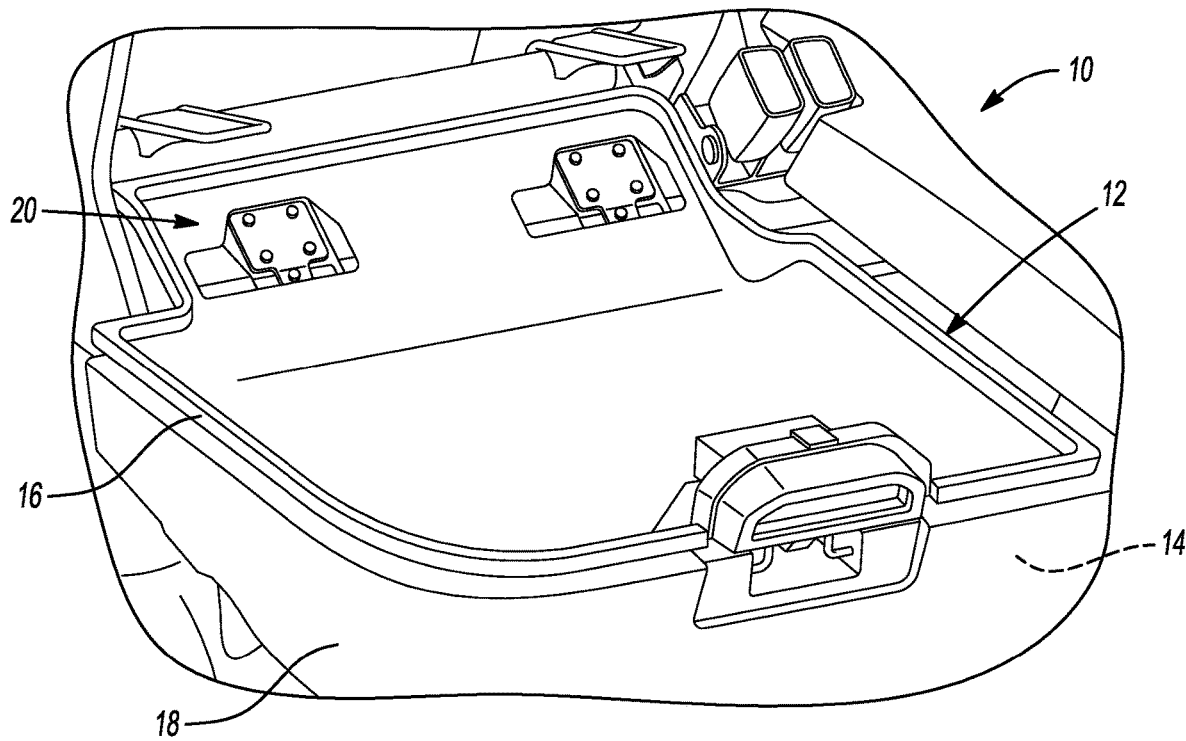
FIG. 1 shows a portion of a vehicle seat bottom having a hinge arrangement in accordance with embodiments described herein.

FIG. 1 shows a portion of a vehicle seat 10, and in particular, shows a portion of a vehicle seat bottom 12 with the cushion removed. The seat bottom 12 provides a storage compartment 14, which is accessible by lifting a cover portion 16. The cover portion 16, which in this embodiment is a storage-compartment cover—is pivotably attached to a portion 18 of a seat frame of the vehicle seat. More specifically, the cover portion 16 is attached to the frame portion 18 by a hinge arrangement 20. The hinge arrangement 20 is shown in an exploded view in FIG. 2.

Figure 2:
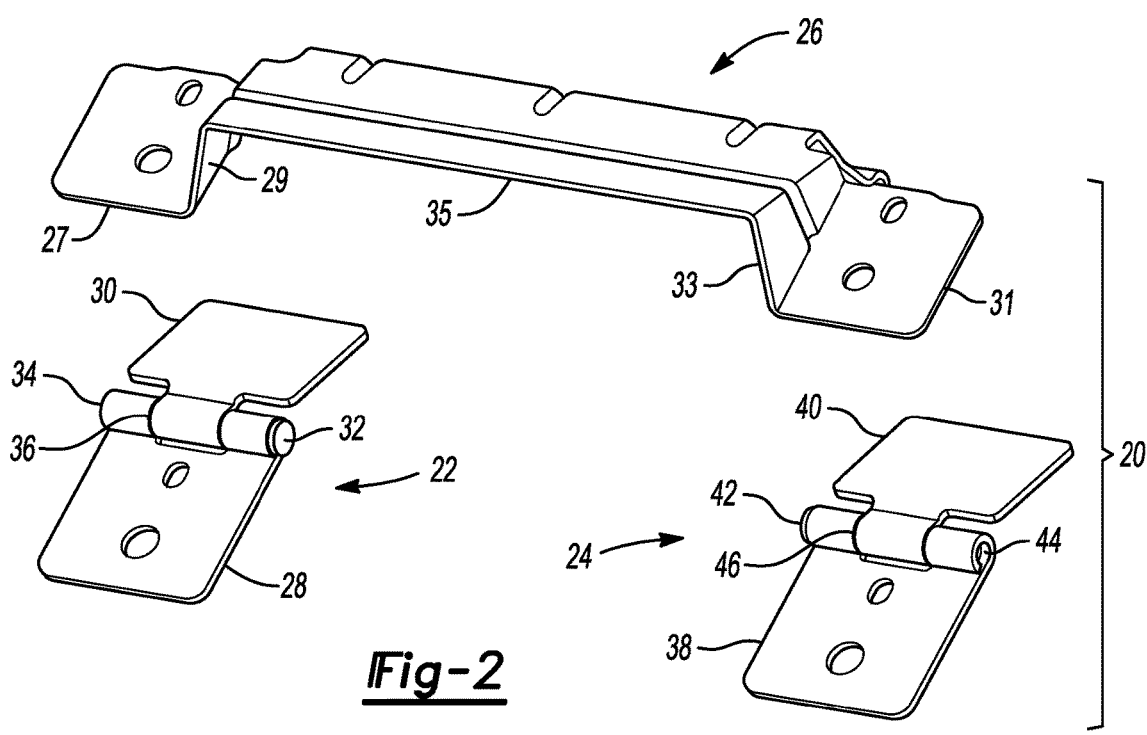
FIG. 2 shows an exploded view of a hinge arrangement in accordance with embodiments described herein.

In the embodiment shown in FIGS. 1 and 2, the hinge arrangement 20 includes first and second hinges 22, 24 and a support structure 26. The first hinge 22 includes a first plate 28 pivotably connected to a second plate 30 by a first elongated member or first hinge pin 32. The hinge pin 32 is disposed at least partially through an opening 34 in the first plate 28 and an opening 36 in the second plate 30. Similarly, the second hinge 24 includes a first plate 38 pivotably connected to a second plate 40 by a second elongated member or second hinge pin 42. The hinge pin 42 is disposed at least partially through an opening 44 in the first plate 38 and an opening 46 in the second plate 40.

In the embodiment shown in FIG. 2, the support structure 26 includes a first flange 27 and a first riser 29 projecting outwardly from the first flange 27, a second flange 31 and a second riser 33 projecting outwardly from the second flange 31, and a connecting member 35 attached to and connecting the first riser 29 and the second riser 33. The first and second risers 29, 33 and the connecting member 35 may be conveniently referred to as a bridge 37 that connects the two flanges 27, 31.

Figure 3:
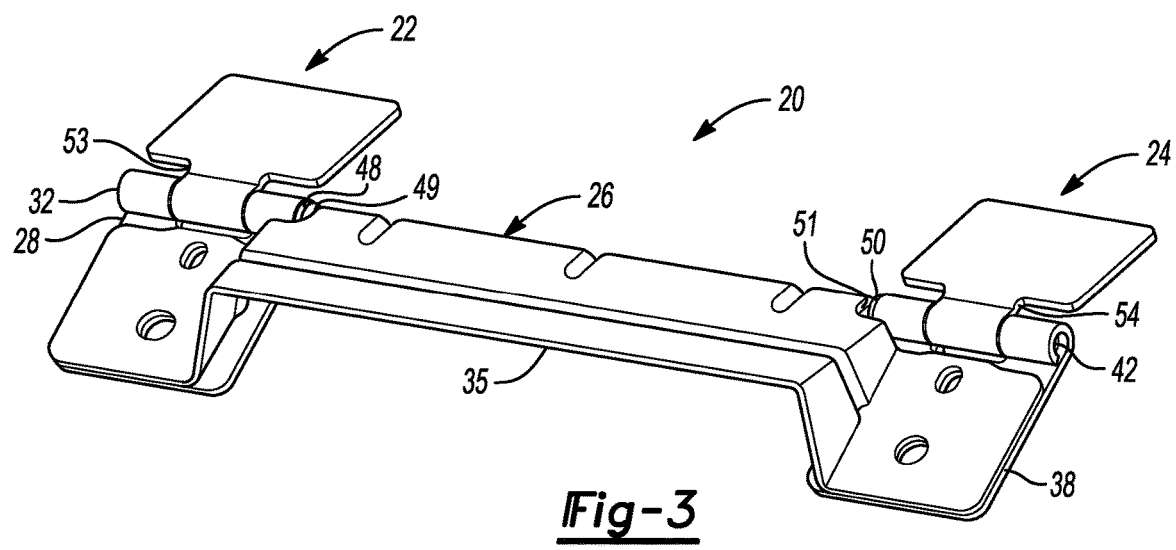
FIG. 3 shows an assembled view of the hinge arrangement shown in FIG. 2.

FIG. 3 shows the hinge arrangement 20 with the hinges 22, 24 secured to the support structure 26. In the embodiment shown in FIG. 3, the support structure 26 is tacked onto the first plate 28 of the hinge 22 and the first plate 38 of the hinge 24, for example, by welding. As shown in FIG. 3, when the hinge arrangement 20 is assembled, the support structure 26 is disposed proximate to each of the hinges 22, 24 such that removal of the respective hinge pins 32, 42 is inhibited. More specifically, the bridge 35 blocks removal of the first and second hinge pins 32, 42 from their respective hinges 22, 24. This may be particularly important if the hinge arrangement 20 is subjected to high forces, for example, in the case of a vehicle impact. More specifically, each of the hinge pins 32, 42 includes a respective head 48, 50. In the embodiment shown in FIG. 3, each of the heads 48, 50 is positioned on an inboard side of its respective hinge 22, 24, and the heads 48, 50 therefore inhibit removal of the respective pins 32, 42 in an outboard direction. In the absence of the support structure 26, however, the pins 32, 42 could potentially be removed or forcibly ejected toward an inboard direction. In the embodiment shown in FIG. 3, however, a first portion 49 of the support structure 26 is positioned proximate to the first hinge pin 32 such that removal of the pin 32 from the two plates 28, 30 is inhibited. Similarly, a second portion 51 of the support structure 26 is positioned proximate to the second hinge pin 42 such that removal of the pin 42 from the two plates 38, 40 is inhibited. In this way, the support structure 26 helps to maintain the integrity of the hinge arrangement 20 even in the presence of a relatively high ejection force.

Figure 4:
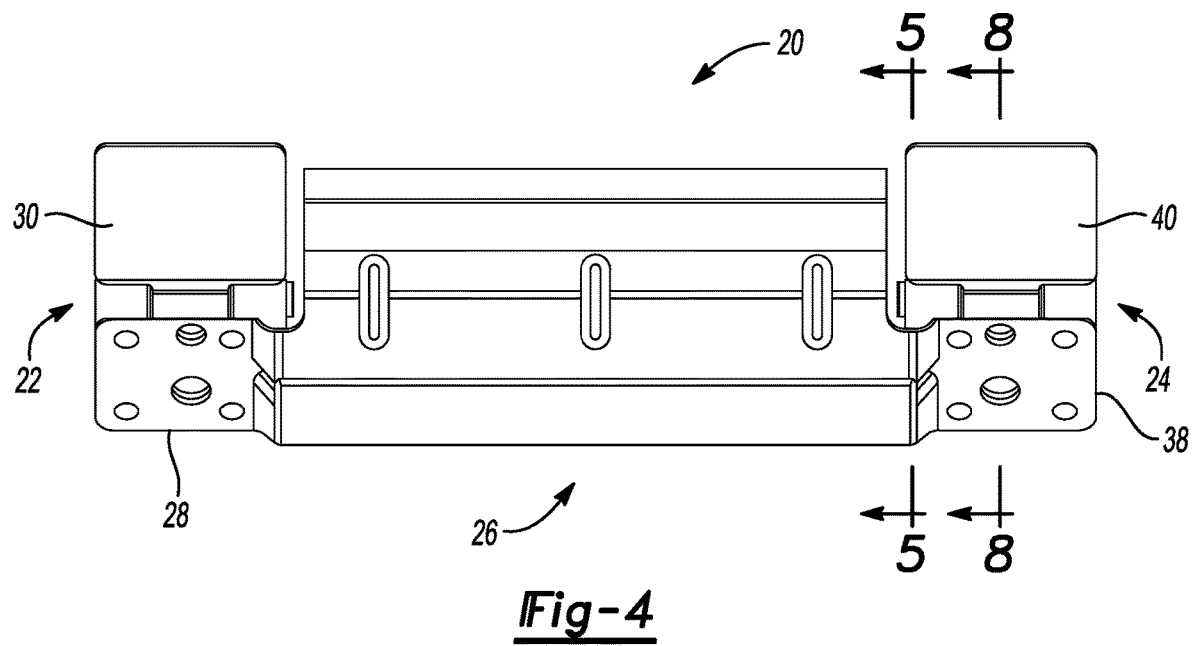
FIG. 4 shows a top view of the hinge arrangement shown in FIG. 2.
Figure 5:
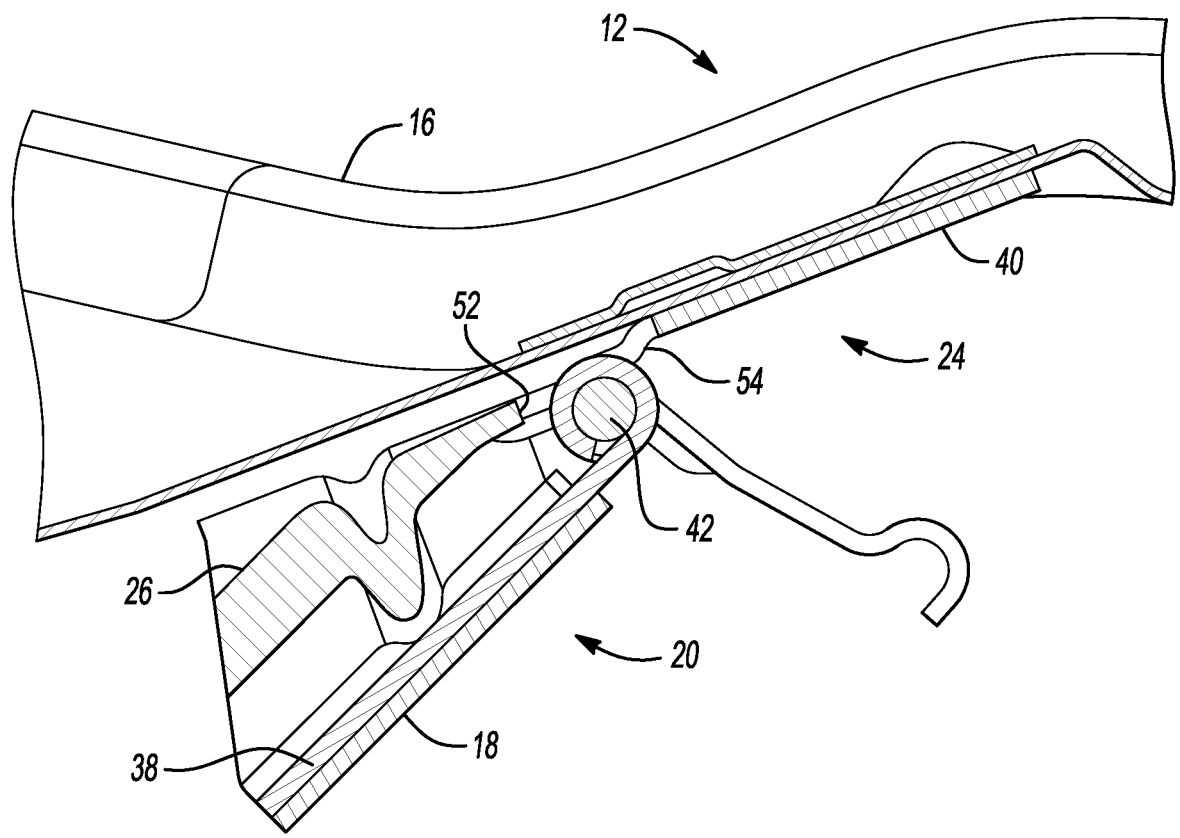
FIG. 5 shows a side view of the hinge arrangement attached to a portion of the vehicle seat bottom.
Figure 6:
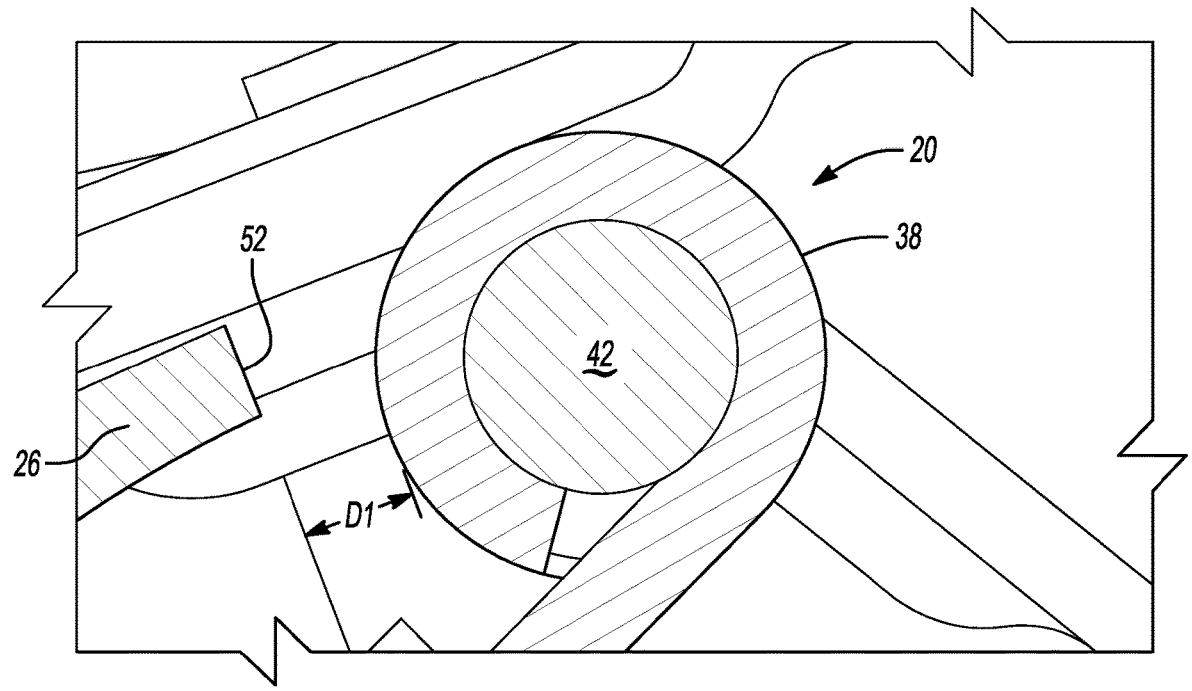
FIG. 6 shows a detail view of one of the hinge plates in its design position.
Figure 7:
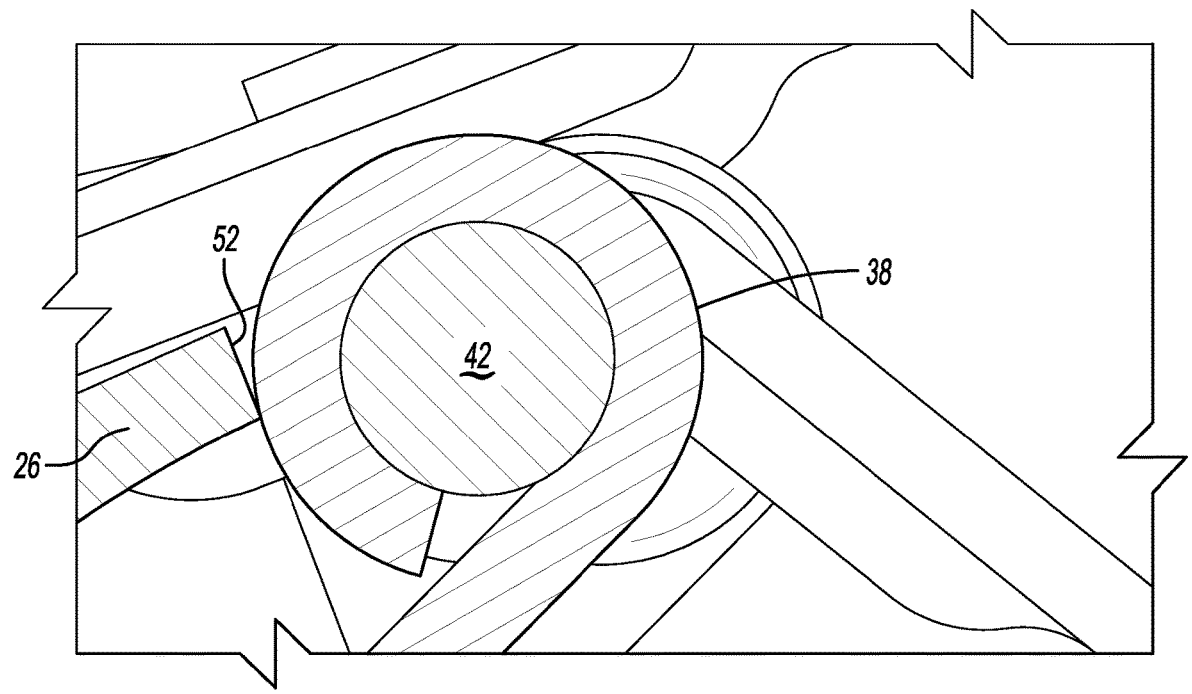
FIG. 7 shows the hinge plate after being exposed to the forces of a vehicle impact.
Figure 8:
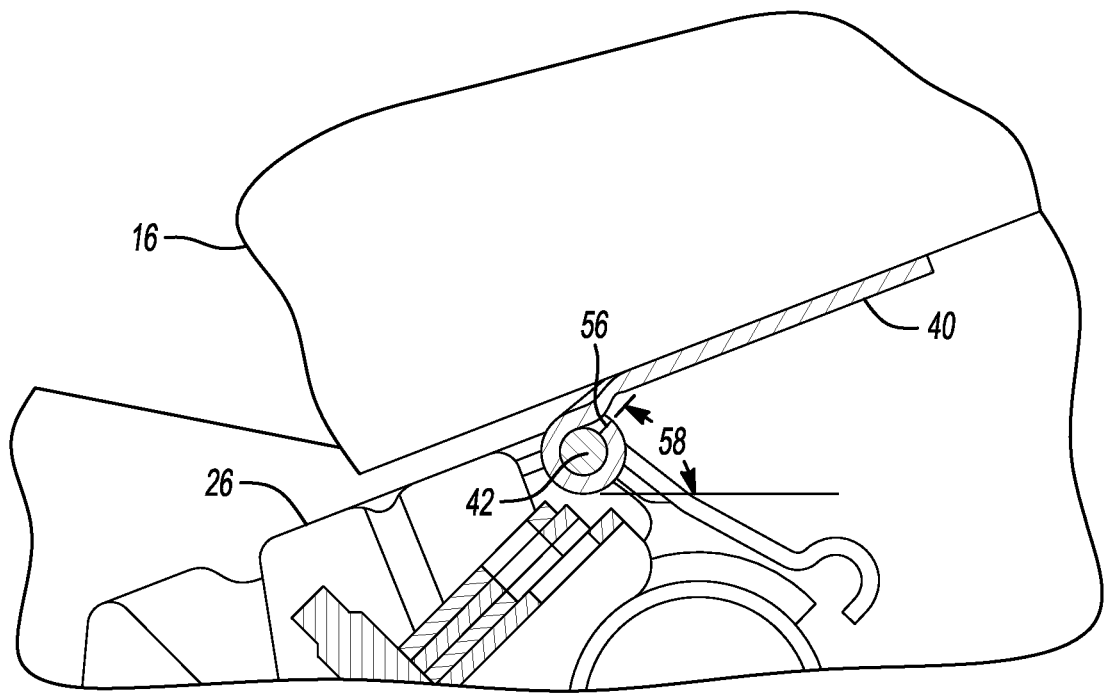
FIG. 8 shows a view of one of the hinges attached to a portion of the vehicle seat bottom in its design position.
Figure 9:
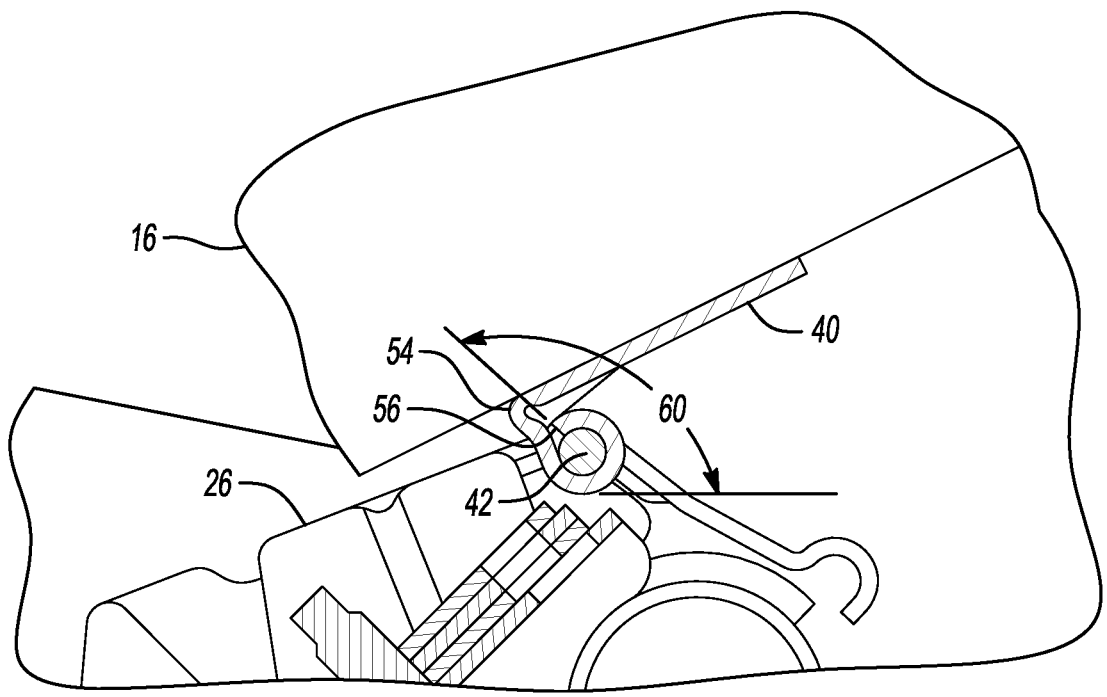
FIG. 9 shows one of the plates of the hinge plastically deformed after being exposed to the forces of a vehicle impact.

FIG. 4 shows a top view of the hinge arrangement 20 with cut lines through the hinge 24, providing reference for the sectional views in FIGS. 5-9. Specifically, FIGS. 5-7 are sections through line 5-5 and FIGS. 8-9 are sections through line 8-8. Although the sectional views are of the hinge 24, it is understood that they also apply to the hinge 22 on the opposite side of the support structure 26. FIG. 5 shows a side sectional view of a portion of the cover portion 16 of the seat bottom 12, the hinge 24, and the support structure 26. As shown in FIG. 5, the hinge 24 is in its design position—i.e., it is installed and operating under normal conditions. Under these conditions, there is a gap between the hinge plate 38 and an edge 52 of the support structure 26. This is illustrated in the detail view shown in FIG. 6. As shown in FIG. 6, there is a separation distance (D1) between the hinge plate 38 and the edge 52 of the support structure 26 when the hinge arrangement 20 is in the design position. When subject to a large force, such as may occur in the case of a vehicle impact, the hinges 22, 24 may undergo plastic deformation. Thus, in addition to ejection of the hinge pins 32, 42, the hinge plates may deform and undesirably separate from each other or from the seat bottom 12.

This is another advantage of having a hinge arrangement, such as the hinge arrangement 20 described above, especially one that includes a support structure, such as the support structure 26. In FIG. 7, the hinge 24 has been subjected to a high loading condition and has deformed such that the plate 38 has moved in the direction of the edge 52 of the support structure 26. As shown in FIG. 7, the support structure 26 is positioned such that deformation of the plate 38 in a predetermined direction—in this embodiment in a direction toward the front of the vehicle—is limited by contact with the support structure 26, and in particular, with the edge 52, which is part of the bridge 35. Also shown in FIG. 7 is the hinge pin 42 still in place: even if the forces acted to eject the pin 42 toward an inboard direction, its motion in this direction would be inhibited by the support structure 26—see also, FIG. 3. Although the cross-sectional views of FIGS. 4-6 illustrate the interaction between the first plate 38 of the first hinge 22 and the support structure 26, it is understood that a similar interaction occurs between the support structure 26 and the first hinge plate 28 of the second hinge 24 on an opposite side of the support structure 26. Therefore, the first and second hinges 22, 24 are positioned relative to the support structure 26 such that deformation in a predetermined direction of at least one of the two plates 28, 30 of the first hinge 22 and at least one of the two plates 38, 40 of the second hinge 24 is limited by contact with the support structure 26.

In addition to the hinge arrangement 20 being configured to limit movement of the first hinge plates 28, 38 and the hinge pins 32, 42, embodiments of the hinges 22, 24 may also include features that promote controlled deformation of the second hinge plates 30, 40. For example, as shown in FIG. 5, the hinge plate 40 includes a step 54, which creates a predetermined area of deformation. Also shown in FIG. 5 is that in the design position—i.e., when the cover portion 16 of the seat bottom is closed as shown in FIG. 1—the hinge plate 40 is on the opposite side of the hinge pin 42 of the hinge plate 38. More specifically, the first hinge plate 38 is attached to one vehicle structure—i.e., the frame portion 18—on one side of the hinge pin 42, which is generally toward the left in FIG. 5, and the second hinge plate 40 is attached to a different vehicle structure—i.e., the cover 16—on a second side of the hinge pin 42 opposite the first side, or generally to toward the right in FIG. 5. Stated another way, the first hinge plate 38 extends outward in a first direction relative to the hinge pin 42, while the second hinge plate 40 extends outward in a second direction relative to the hinge pin 42 that is opposite to the first direction. This configuration may also promote plastic deformation of the plate 40 when the hinge arrangement 20 is subjected to a relatively large force. It is understood that the plate 30 is similarly configured and also designed to undergo plastic deformation in the presence of a large force. Deformation of the hinge plates 30, 40 helps to absorb some of the impact force, thereby reducing the force and associated stresses in other portions of the hinges 22, 24.

FIG. 8 shows a side view of a portion of the hinge arrangement 20, and in particular, shows portions of the hinge plate 40 and the hinge pin 42. In the view shown in FIG. 8, the hinge arrangement 20 is in the design position, subject only to forces associated with normal use. The hinge plate 40 is wrapped around the hinge pin 42 and at the end of the plate, a small gap 56 is formed. Choosing a baseline along the bottom of the plate 40 and continuing to the gap 56, an angle 58 is formed. In the event of a front impact, the plate 40 may be subjected to high stresses that tend to move the plate 40 forward—which is toward the left in FIG. 8—and upward. If the hinge plate 40 were on the same side of the pin 42 as the plate 38, this movement could cause the gap 56 to increase and the plate 40 to "unwrap" from around the pin 42. With the configuration shown in FIGS. 4 and 7, the movement of the plate 40 caused by the impact forces tends to wrap the plate 40 more securely around the pin 42. The pin 42 is forward of the portion of the hinge plate 40 attached to cover portion 16 when in the design position. Therefore, in the event of a front impact which tends to move the hinge plate 40 forward (and upward), the hinge plate 40 is moved toward the pin 42 and disengagement of the plate 40 and the pin 42 is inhibited.

This is illustrated in FIG. 9, which shows the hinge plate 40 after it has been subjected to a large force such as may be seen during a vehicle front impact. As shown in FIG. 9, the stepped portion 54 of the hinge plate 40 has undergone significant deformation, which has absorbed forces that would otherwise be transferred to other portions of the hinge 24. In addition, because of the position of the plate 40 when it is in the design position, the impact forces tend to secure the plate 40 to the pin 42 rather than disengage it from the pin 42. If the hinge plate 40 was secured to the cover portion 16 on the same side of the pin 42 as the hinge plate 38—see, e.g., FIG. 5—the hinge plate 40 would be positioned forward of the pin 42. With this configuration, a front vehicle impact would move the hinge plate 40 away from the pin 42, which would tend to unwrap the hinge plate 40 from the pin 42.

Still using the bottom of the plate 40 as a baseline, an angular measurement 60 to the gap 56 has increased significantly from the angle 58 shown in FIG. 8. In the embodiment illustrated in the drawing figures and described above, the step 54 created the predetermined area of deformation. In each case, however, the deformable portion represents a discontinuity in the plate that facilitates deformation in that location. In the same way, the support structure 26 also inhibits deformation of the plate 30 of the first hinge 22. For the embodiment shown in FIGS. 5 and 6, one of the plates 28, 30, 38, 40 of each of the first hinge 22 and the second hinge 24 includes a deformable portion 53, 54 defined at least in part by a discontinuity therein. In this embodiment, the deformable portions 53, 54 are step discontinuities, although different embodiments may have different types of discontinuities. More specifically, as an alternative, or in conjunction with a step, a hinge plate may include an area of reduced thickness or width, it may include holes, or it may include some combination of these or other features to promote deformation in the desired area.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hinge arrangement for a vehicle seat, comprising:
   a first hinge including a first plate pivotably connected to a second plate by a first elongated member disposed at least partially through an opening in the first plate and at least partially through an opening in the second plate such that the first plate and second plate are pivotable about the first elongated member; and
   a support structure disposed proximate to the first hinge such that removal of the first elongated member from the openings in the first and second plates is inhibited by the support structure; and
   a second hinge having two plates pivotably connected by a second elongated member, and wherein the support structure is disposed proximate to the second hinge such that removal of the second elongated member from the two plats of the second hinge is inhibited by the support structure;
   wherein the support structure includes a first flange and a second flange connected by a bridge, and the first hinge is attached to one of the first flange or the second flange, and the second hinge is attached to the other of the first flange or the second flange.

2. The hinge arrangement of claim 1, wherein the support structure is positioned relative to the first hinge such that deformation of at least one of the first plate or the second plate in a predetermined direction is limited by contact with the support structure.

3. The hinge arrangement of claim 1, wherein the support structure is affixed to one of the first plate or the second plate.

4. The hinge arrangement of claim 1, wherein the second plate includes a deformable portion defined at least in part by a step in the second plate.

5. The hinge arrangement of claim 1, wherein the bridge is positioned relative to the first flange and the second flange such that the bridge blocks removal of the first elongated member from the first hinge and blocks removal of the second elongated member from the second hinge.

6. The hinge arrangement of claim 1, wherein the bridge is positioned relative to the first flange and the second flange such that the bridge limits deformation in a predetermined direction of the first hinge and the second hinge.

7. The hinge arrangement of claim 1, wherein the first plate is attached to a vehicle structure on a first side of the first elongated member, and the second plate is attached to a different vehicle structure on a second side of the first elongated member opposite the first side of the first elongated member.

8. A hinge arrangement for a vehicle seat, comprising:
   a first hinge including first and second hinge plates pivotably connected by a first hinge pin; and
   a support structure disposed proximate the first hinge such that at least one of removal of the first hinge pin from the first hinge is inhibited or deformation of the first hinge in a predetermined direction is limited by contact with the support structure; and
   a second hinge including first and second hinge plates pivotably connected by a second hinge pin, and wherein the support structure is disposed proximate the second hinge such that at least on of removal of the second hinge pin from the second hinge is inhibited or deformation of the second hinge in the predetermined direction is limited by contact with the support structure;
   wherein the support structure includes a first flange and a second flange connected by a bridge, and the first hinge is attached to one of the first flange or the second flange, and the second hinge is attached to the other of the first flange or the second flange.

9. The hinge arrangement of claim 8, wherein the first hinge plate is attached to a vehicle structure on one side of the first hinge pin, and the second hinge plate is attached to a different vehicle structure on a second side of the first hinge pin opposite the first side of the first hinge pin.

10. The hinge arrangement of claim 9, wherein the vehicle structure is one of a seat frame or a storage-compartment cover, and the different vehicle structure is the other of the seat frame or the storage-compartment cover.

11. A hinge arrangement for a vehicle seat, comprising:
    a support structure including a first flange; and
    a first hinge including two plates pivotably connected by a first hinge pin, one of the two plates being affixed to the first flange, and wherein a first portion of the support structure is positioned proximate to the first hinge pin such that removal of the first hinge pin from the two plates is inhibited by the first portion of the support structure; and
    a second hinge including two plates pivotably connected by a second hinge pin, and wherein the support structure includes a second flange having one of the two plates of the second hinge affixed thereto, the support structure further including a second portion positioned proximate to the second hinge pin such that removal of the second hinge pin from the two plates of the second hinge is inhibited by the second portion of the support structure.

12. The hinge arrangement of claim 11, wherein the first and second hinges are positioned relative to the support structure such that deformation in a predetermined direction of at least one of the two plates of the first hinge and at least one of the two plates of the second hinge is limited by contact with the support structure.

13. The hinge arrangement of claim 11, wherein one of the plates of each of the first hinge and the second hinge includes a deformable portion defined at least in part by a discontinuity therein.

14. The hinge arrangement of claim 11, wherein one plate of the two plates of the first hinge is attached to a vehicle structure extending outward in a first direction relative to the first hinge pin, and the other of the two plates of the first hinge is attached to a different vehicle structure extending outward in a second direction relative to the first hinge pin opposite the first direction.

15. The hinge arrangement of claim 14, wherein the vehicle structure is one of a seat frame or a storage-compartment cover, and the different vehicle structure is the other of the seat frame or the storage-compartment cover.

* * * * *

UNITED STATES PATENT AND TRADEMARK OFFICE
CERTIFICATE OF CORRECTION

PATENT NO. : 11,702,013 B2
APPLICATION NO. : 17/316891
DATED : July 18, 2023
INVENTOR(S) : Yoshikazu Okamoto et al.

It is certified that error appears in the above-identified patent and that said Letters Patent is hereby corrected as shown below:

In the Claims

Column 5, Lines 49-50, Claim 1:
After "second elongated member from the two"
Delete "plats" and
Insert -- plates --.

Column 6, Line 27, Claim 8:
After "second hinge such that at least"
Delete "on" and
Insert -- one --.

Signed and Sealed this
Twenty-sixth Day of March, 2024

Katherine Kelly Vidal
*Director of the United States Patent and Trademark Office*